United States Patent [19]
Sharaf

[11] 3,808,522
[45] Apr. 30, 1974

[54] METHOD OF TESTING THE CAPACITY OF A LEAD-ACID BATTERY

[75] Inventor: Harold M. Sharaf, Milton, Mass.

[73] Assignee: Anderson Power Products, Inc., Boston, Mass.

[22] Filed: Nov. 3, 1972

[21] Appl. No.: 303,305

[52] U.S. Cl. ............................................. 324/29.5
[51] Int. Cl. ......................................... G01n 27/46
[58] Field of Search...................... 324/29.5; 320/48

[56] References Cited
UNITED STATES PATENTS
3,676,770   7/1972   Sharaf.............................. 324/29.5

Primary Examiner—Alfred E. Smith
Attorney, Agent, or Firm—Chittick, Thompson & Pfund

[57] ABSTRACT

A method of testing the capacity of a lead-acid battery where the internal resistance of the battery is initially measured when the battery is relatively young and the internal resistance is subsequently measured periodically. By comparing the values obtained on these subsequent measurements with the initial value, it is determined when a substantial increase occurs in the internal resistance of the battery. This substantial increase indicates that the battery is near the end of its life.

5 Claims, 2 Drawing Figures

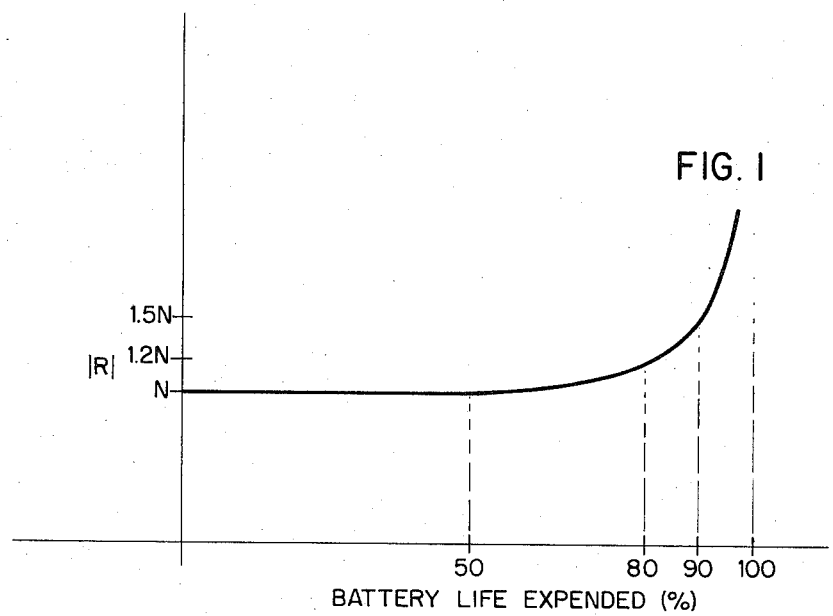

METHOD OF TESTING THE CAPACITY OF A LEAD-ACID BATTERY

BACKGROUND OF THE INVENTION

This invention relates to testing the capacity of a lead-acid battery.

At the present time, the capacity of a lead-acid storage battery is generally determined by subjecting the battery to an ampere-hour discharge test where the battery's voltage during discharge is compared with voltage-time curves supplied by the battery's manufacturer. This method requires a relatively long time and relatively large charge-discharge equipment.

OBJECTS AND SUMMARY OF THE INVENTION

It is an object of this invention to provide a method of testing the capacity of a lead-acid battery which is easily performed.

It is a further object of this invention to provide such a method which requires only a short time and does not necessitate large equipment.

According to the invention, the useful capacity of a lead-acid battery is tested by determining when a substantial increase occurs in the battery's internal resistance. This increase indicates that the battery is near the end of its life. In practicing the method, the internal resistance of the battery is initially measured relatively early in the battery's life and subsequent measurements of the battery's internal resistance are periodically taken thereafter. The values obtained on the subsequent measurements are compared with the value obtained on the initial measurement and when a subsequent value exceeds the initial value by a predetermined amount, the battery is near the end of its life.

BRIEF DESCRIPTION OF THE DRAWING

FIG. 1 is a curve illustrating the principle on which the invention is based; and, FIG. 2 in block diagram illustrating the method of the invention.

DETAILED DESCRIPTION

Although other causes may bring about the end of the useful life of a lead-acid battery, generally it is due to extensive degradation of the battery's positive plates. The lead supports of the grid and the paste of the positive plates erode and disintegrate. The paste falls to the bottom of the cells and forms a sludge. As each positive plate of the battery disintegrates and erodes it is reduced in size and its resistance increases. Thus, in the usual case where the end of the useful life of the battery is due to degradation of its positive plate sections and where the battery acid is maintained at a reasonable concentration and the battery's terminals are not corroded, a determination of when the battery is near the end of its life may be obtained by using the battery's internal resistance.

Although the state of charge of the battery also affects its resistance, if the battery's charge is sufficiently high this factor may be eliminated and the internal resistance may be used to provide a measure of the remaining battery capacity. In particular, if the specific gravity of the battery's electrolyte is greater than 1,150 points (1.15 specific gravity), the state of charge of the battery will not appreciably affect its internal resistance.

FIG. 1 shows a curve indicating the battery's internal resistance vs. its useful life. As illustrated, the internal resistance of the battery maintains itself essentially constant early in the battery's life as shown at the left side of the curve. As the battery approaches the end of its life, the value of its internal resistance rises sharply. This is due, as explained above, to the decrease in the positive pole plates' surfaces as they erode and disintegrate. As shown in the drawing, initially when the battery is young, the absolute value of the battery's internal resistance is designated N. As the battery gets older this value of internal resistance is maintained relatively constant but begins to increase noticeably when about 50 percent of the battery's useful life has been expended. When 80 percent of the battery's useful life has been expended, the value of the battery's internal resistance is approximately 1.2 times N. When 90 percent has been expended the value of the battery's resistance is about 1.5 times N. Thus, by measuring periodically the battery's internal resistance, it may be ascertained when the battery is near the end of it's life.

With the invention, the initial internal resistance value of the battery is ascertained when the battery is relatively young. Thereafter, on periodic succeeding occasions, the internal resistance of the battery is measured and compared with this initial value. When one of these subsequent measurements is a predetermined amount in excess of the initial value, it is ascertained that the battery is near the end of its life. For example, this predetermined amount may be set as one-half the initial resistance value N of the battery. In which case, as illustrated in the drawing, only about 10 percent of the battery's useful life will remain.

In practicing the invention, it is preferable to mark the initial value of the battery's internal resistance directly on the battery itself so that one may easily compare this initial value with subsequent resistance measurements made later in the battery's life. Any manner of measuring the battery's true internal resistance may be used, but preferably, the battery's internal resistance is measured using the system disclosed and claimed in U.S. Pat. No. 3,676,770, issued to H.M. Sharaf, et al., on July 11, 1972 and assigned to the same assignee as is the present application.

It will be appreciated that various changes in the form and details of the above described preferred embodiments may be effected by persons of ordinary skill in the art without departing from the true spirit and scope of the invention.

I claim:

1. A method of testing the capacity of a load-acid battery comprising the steps of:
   initially measuring the internal resistance of said battery when the specific gravity of the battery's electrolyte is greater than 1.150;
   subsequently measuring the internal resistance of said battery when the specific gravity of the battery's electrolyte is greater than 1.150; and,
   comparing the values of the initial and subsequent measurements to ascertain if the value of said subsequent value exceeds the value of said initial value by a predetermined amount.

2. The method as recited in claim 1 wherein said initial measurement is made when said battery is relatively young.

3. The method as recited in claim 2 and including recording said initial measurement directly on said battery so that it may be later compared with the value of said subsequent measurement.

4. The method as recited in claim 2 wherein said predetermined amount by which said subsequent value is to exceed said initial value is about one-half said initial value, thereby indicating that about only 10 percent of said battery's useful life remains.

5. The method as recited in claim 2 including periodically repeating said subsequent measuring of the internal resistance of said battery and said comparing of said subsequent values obtained with said initial value, until one of said subsequent values exceeds said initial value by a predetermined amount.

* * * * *